Sept. 23, 1924.

O. G. JOHNSON 1,509,299

RETURN TRAP

Filed April 3, 1922    3 Sheets-Sheet 1

Inventor
Oscar G. Johnson
Barnett Truman,
Attorneys

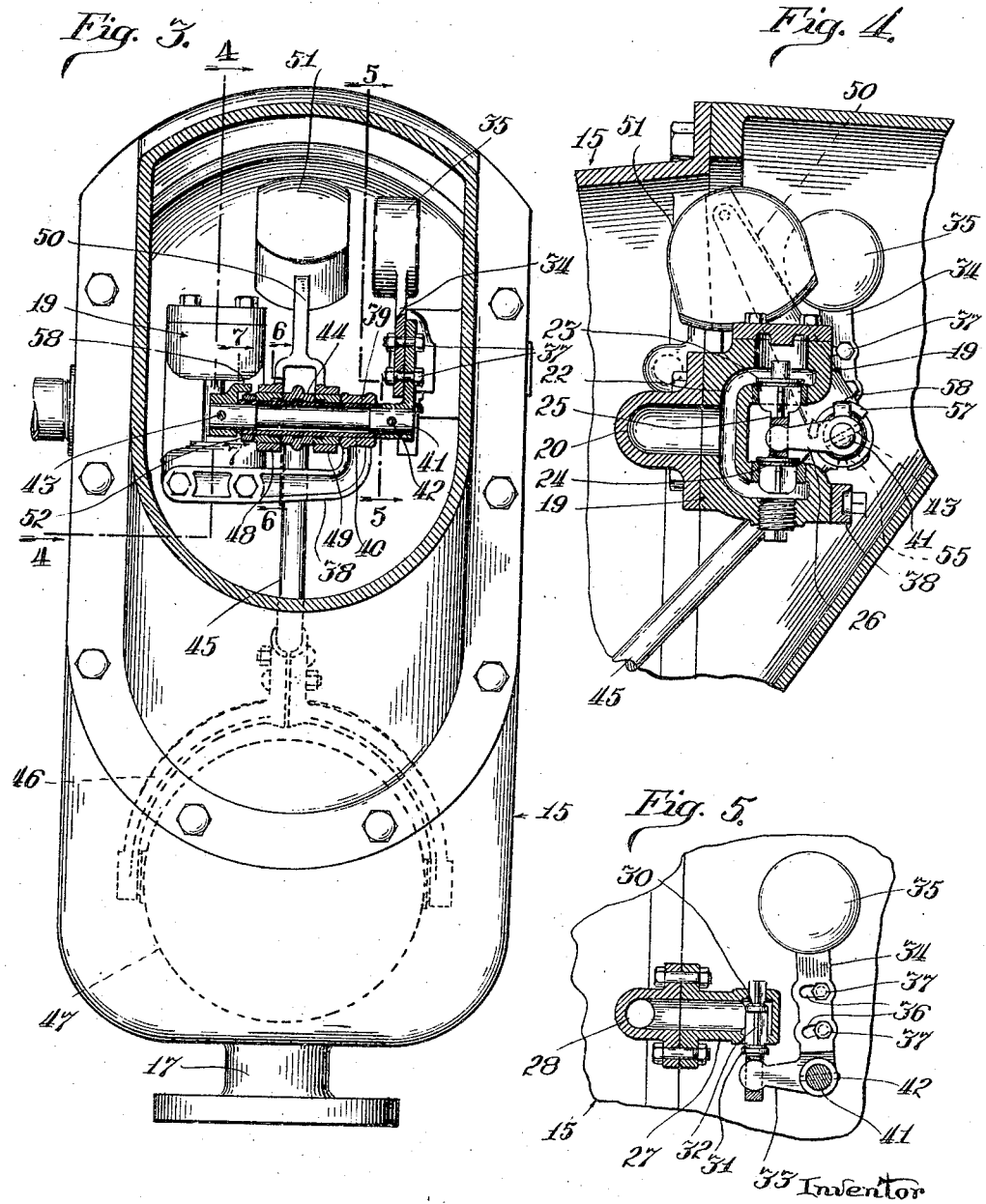

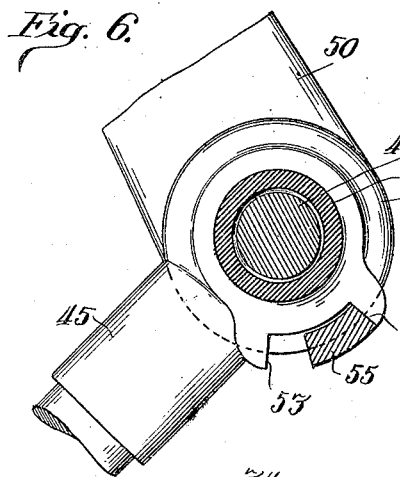
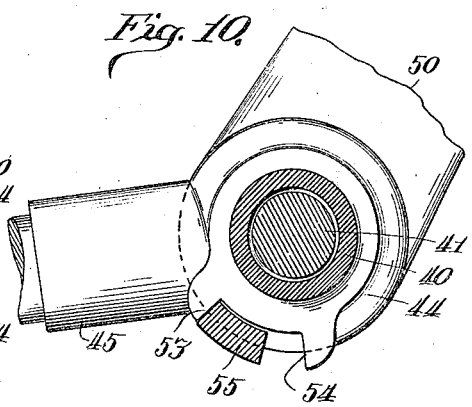
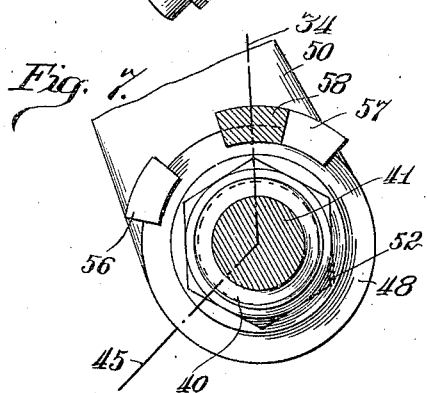
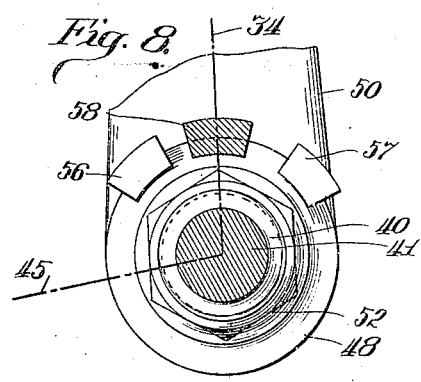
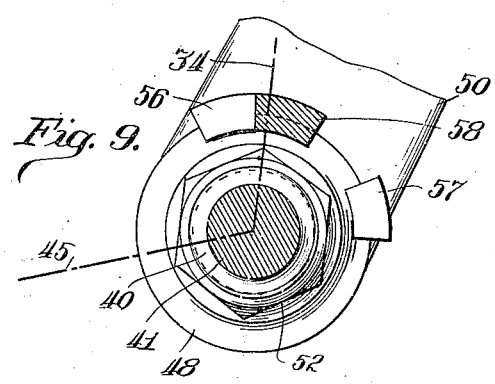
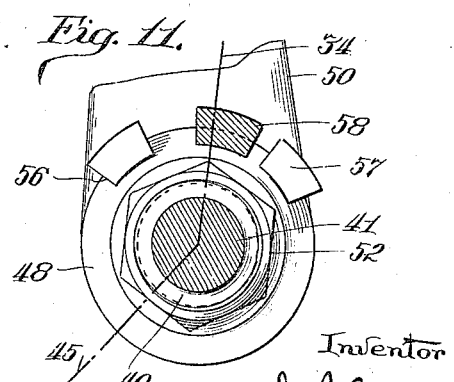

Patented Sept. 23, 1924.

1,509,299

UNITED STATES PATENT OFFICE.

OSCAR G. JOHNSON, OF MARSHALLTOWN, IOWA, ASSIGNOR TO C. A. DUNHAM COMPANY, OF MARSHALLTOWN, IOWA, A CORPORATION OF IOWA.

RETURN TRAP.

Application filed April 3, 1922. Serial No. 548,934.

*To all whom it may concern:*

Be it known that I, OSCAR G. JOHNSON, a citizen of the United States, residing at Marshalltown, in the county of Marshall and State of Iowa, have invented certain new and useful Improvements in Return Traps, of which the following is a specification.

My invention relates to return traps of the class adapted for carrying water into a receptacle containing steam or other fluid under pressure, and it is particularly designed for returning the water of condensation to the boiler of a heating system.

It is one of the objects of my invention to provide a new and improved form and arrangement of parts by which all moving parts are completely enclosed, and by which the use of stuffing boxes is avoided.

It is another object of my invention to improve devices of this type in sundry details hereinafter pointed out. The preferred means by which I have accomplished my several objects are illustrated in the drawings and are hereinafter specifically described. That which I believe to be new and desire to cover by Letters Patent is set forth in the claims.

In the drawings—

Fig. 3 is a vertical cross section taken at line 3—3 of Fig. 1.

Figure 1:
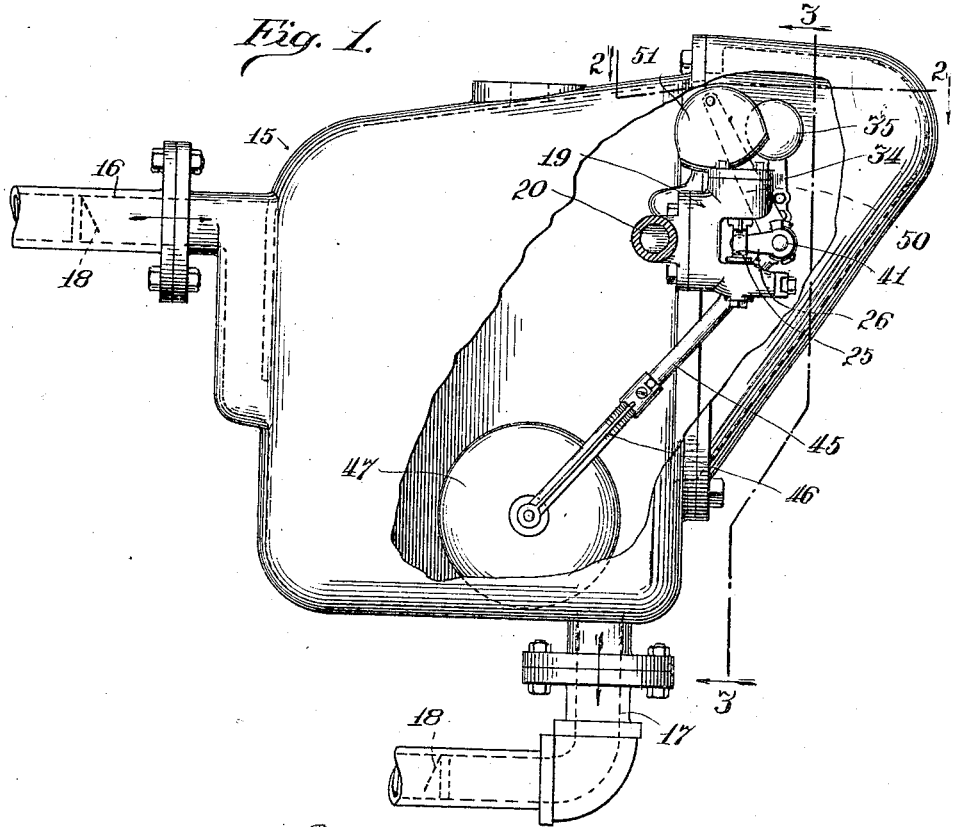
Fig. 1 is a side view of my improved trap, partly broken away.

Figs. 4 and 5 are vertical cross sections taken on lines 4—4 and 5—5 of Fig. 3, respectively.

Fig. 6 is an enlarged detail view, being substantially a cross section taken at line 6—6 of Fig. 3.

Fig. 7 is an enlarged detail view, being partly diagrammatic, being substantially a section taken at line 7—7 of Fig. 3.

Fig. 8 is a view similar to Fig. 7, but showing the changed position of the parts when the float has risen substantially to its highest point and the parts are ready for an operative movement.

Fig. 9 is a view similar to Fig. 8, but showing a changed position of the parts after the operation of the quick movement mechanism.

Fig. 10 is a view similar to Fig. 6, but showing a changed position of the parts when the float is at its uppermost point ready for its downward movement as the level of the water descends.

Fig. 11 is a view similar to Fig. 9, but showing a changed position of the parts when the float reaches substantially its lowermost point on its downward movement, the quick movement mechanism being substantially in position to act.

Referring to the several figures of the drawings, in which corresponding parts are indicated by the same reference characters, 15 indicates a tank, adapted to receive water of condensation through a pipe 16. An outlet pipe 17 is provided at the bottom of the tank 15 for taking the water from the tank for delivery into a boiler when conditions have been prepared making such movement of the water possible. In each of the pipes 16 and 17 I have provided a check valve 18 of any approved type adapted to permit the flow of the water in one direction, but to resist flow of water or steam in the opposite direction.

In order to permit the water of condensation to enter the tank 15, it is necessary that an outlet to the air be provided, and in order to permit the water to flow from the tank 15 into the boiler of the heating system, it is necessary that the pressure within the tank 15 be brought up to a point at least as high as that within the boiler. I have, therefore, provided means for supplying steam to the tank 15 and at the same time closing the air outlet from the tank, for permitting the water to drain from the tank into the boiler. After this draining operation has been completed, the supply of steam is shut off from the tank and the air outlet is again opened to permit a new supply of water to collect in the tank 15. In the construction illustrated, the opening of the valve for the admission of steam and the closing of the air outlet port are effected automatically through the use of a float controlled by the level of the water in the tank.

Figure 2:
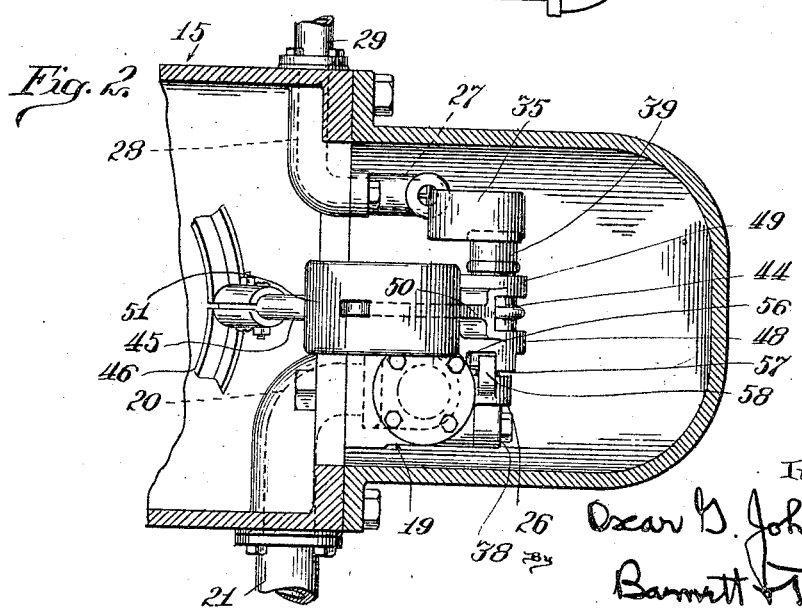
Fig. 2 is a horizontal cross section taken at line 2—2 of Fig. 1.

For controlling the entrance of steam, I have provided a valve comprising a body 19 mounted rigidly in position upon the frame work of the tank 15, steam being delivered to the casing 19 through a port 20 provided in the wall of the tank 15, the port communicating at its outer end with a steam pipe 21, as is best shown in Fig. 2. The casing 19 is provided with a steam chamber 22, as is best shown in Fig. 4, the chamber 22 being closed from the interior of the tank 15 by a balanced double valve construction comprising valves 23 and 24 mounted upon a stem 25 adapted to be operated by an arm 26. As will be readily understood, when the arm 26 is moved upwardly, the valves 23 and 24 are moved out of engagement with their seats so as to permit the steam to pass from the chamber 22 to the interior of the tank 15.

The air outlet valve (see Fig. 5) comprises a casing 27 which communicates with a port 28 formed in the wall of the tank 15, the port 28 in turn being in communication with an outlet pipe 29. Substantially balanced valves 30 and 31 are provided for closing ports in the housing 27 leading from the interior thereof to the interior of the tank 15, the valves 30 and 31 being mounted upon a valve stem 32 so as to be movable in unison by the use of an arm 33. As will be readily understood, when the arm descends, the valves 30 and 31 are moved from their seats so as to permit the air to escape from the interior of the tank 15 to the outside atmosphere. When the arm 33 then is given an upward movement, the valves 30 and 31 are closed and communication between the tank and the outside atmosphere is accordingly closed. For assisting in holding the valves 30 and 31 in closed position, I have provided an arm 34 movable with the arm 33, being provided at its upper end with a weight 35. When the arm 33 is moved upwardly for closing the valves 30 and 31, the weight 35 is adapted to stand at one side of the axis about which the arm 33 swings so as to assist in holding the valves in closed position. In order to permit an adjustment of the arm 34 so as to procure just the desired pressure through the use of the weight 35, I have provided slots 36 and bolts 37, as is best shown in Fig. 5, whereby the desired adjustment can be made.

For supporting the arm upon which the controlling float is mounted, I have provided an arm 38 extending from the housing 19 of the steam valve, being provided at its outer end with a sleeve 39 in which is fixedly mounted a long bearing sleeve 40 which acts as a bearing for the shaft 41, as is best shown in Fig. 3. As is best shown in Fig. 5, the arm 33 for operating the air port valve is rigidly mounted upon one end of the shaft 41, by means of a pin 42. As is best shown in Figs. 3 and 4, the arm 26 for operating the steam valves 23 and 24, is likewise rigidly mounted upon the opposite end of the shaft 41, being secured in position by means of a pin 43. It is thus seen that the steam valve and the air valve are operated in unison, the arrangement being such that when the steam valve is opened the air valve is closed and vice versa.

The sleeve 40 serves not only as a bearing for the shaft 41, but also has a plurality of sleeves revolubly mounted upon its outer face. A central sleeve 44 revolubly mounted upon the bearing 40 is provided with an arm 45 extending from one side thereof, having a yoke 46 on its lower end, between the arms of which the float 47 is revolubly mounted. On opposite sides of the sleeve 44, there are two sleeves 48 and 49, which are formed on the ends of the arms of a yoke 50, upon the upper end of which there is pivotally mounted a weight device 51. For holding the sleeves 44, 48 and 49 in position upon the bearing sleeve 40, I have provided a nut 52, as is best shown in Fig. 3, the nut 52 being adapted to tighten the sleeves merely enough for proper rotary movement of the sleeves about the bearing sleeve 40.

As is best shown in Figs. 6 and 10, the sleeve 44 upon which the float 47 is supported is provided with lugs 53 and 54, in spaced relation thereon, with a lug 55 mounted upon the sleeve 48 extending between the lugs 53 and 54. As will be readily understood from an inspection of Fig. 6, as water accumulates in the tank 15, causing the float 47 to rise and causing the arm 45 to rise correspondingly, the lug 55 will be moved toward the left in said Fig. 6, serving to swing the arm 50 in clockwise direction in said Fig. 6. As the upward movement of the arm 45 continues under the influence of the float 47, and the arm 50 is swung farther and farther toward the right in Fig. 6, the arm 50 is finally brought to vertical position and very slightly beyond, whereupon the weighted arm 50 is caused to swing toward the right independently of the arm 45 and the yoke 47, the lug 55 being thus moved out of engagement with the lug 54 and into engagement with the lug 53, in the position illustrated in Fig. 10. This movement of the arm 50, under the influence of the weight 51, is designed to take place at substantially the time when the float 47 reaches its uppermost position, the arm 50 and the weight 51 serving as a quick movement mechanism for operating the valve as hereinafter described.

As is clearly shown in Fig. 7, the sleeve 48 in turn is provided with lugs 56 and 57 in spaced relation thereon, with a lug 58 carried by the arm 26 in position between the lugs 56 and 57. As is clearly shown in said Fig. 7, when the arm 45 carrying the float 47 is in its lowermost position, the lug 58 stands substantially in contact with the lug 57. When, however, the float 47 has risen so as to carry the arm 50 substantially to its vertical position, the lugs 58 will be found still in its original position, while the lug 57 will have traveled out of contact, and the lug 56 will have approached the opposite side of the lug 58. As will be readily understood, when the arm 50 is given its quick movement toward the right under the influence of the weight 51, the lug 56 is brought forcibly into contact with the lug 58, as illustrated in Fig. 9, serving to move the lug 58 toward the right. Inasmuch as the lug 58 is fixedly connected with the arm 26, which in turn is fixedly mounted upon the shaft 41, it will be understood that when the arm 50 swings into the position shown in Fig. 9, the arm 26 is moved upwardly and the shaft 41 is given a slight rotation in clockwise direction in Fig. 4, serving accordingly at the same time to move the arm 33 upwardly. It is thus seen that as the arm 50 moves quickly toward the right, under the influence of the weight 51, the steam valves 23 and 24 are opened and the air valves 30 and 31 are at the same time closed. The pressure of the steam within the boiler is thus equalized, and the water is permitted to flow from the tank 15 through the pipe 17 past the check valve 18.

When the water in the tank 15 begins to descend from its high level in the tank, the arm 45 is moved downwardly from the position shown in Fig. 10, serving to move the lug 55 downwardly and serving at the same time to move the arm 50 in counter-clockwise direction in Fig. 10. As this movement progresses, the lug 56 is gradually moved out of contact with the lug 58, and the lug 57 as gradually approaches contact with the lug 58. When the arm 50 passes very slightly beyond its centered position, the weight 51 causes such arm to swing quickly toward the left in Fig. 4, bringing the lug 57 quickly into contact with the lug 58, and serving to move the lug 58 toward the left in Fig. 11. This movement serves to swing the arms 26 and 33 downwardly for again closing the steam valves 23 and 24 and for opening the air valves 30 and 31. It is thus seen that I have provided automatic means for controlling the opening and closing of both the steam valve and the air valve, the opening and closing being under the automatic control of the float 47.

While I prefer to employ the construction as illustrated in the drawings and above described, it will be understood that I do not desire to be limited to the precise details of the construction shown, except as the same is hereinafter specifically claimed, inasmuch as it is evident that many changes can be made in the structure without departing from the spirit of my invention.

I claim:

1. In combination, a shaft, a valve connected with said shaft and operated thereby, a weight arm revolubly mounted on said shaft and adapted to have a limited swinging movement thereabout, a float, and a float arm connected with said float and connected revolubly with said shaft and adapted to have a limited swinging movement with respect to said weight arm, the arrangement being such that the final portion of the movement of the weight arm about the axis of the shaft serves to rotate the shaft for operating the valve.

2. In combination, an enclosed tank, a shaft revolubly mounted in said tank, a valve for admitting steam to said tank, a second valve for the escape of air from the tank, connections between said valves and said shaft for operating said valves in unison upon the rotation of the shaft, a weight arm fixed on said shaft in position to assist in holding the valves in either their open or their closed condition, and a second weight arm carried by said shaft and adapted to have a limited swinging movement with respect thereto for operating said valves substantially as set forth.

3. In combination, an enclosed tank, a shaft therein, a steam inlet valve connected with said shaft and operated thereby, an air outlet valve connected with said shaft and operated thereby, a weight arm revolubly mounted on said shaft and adapted to have a limited swinging movement thereabout, a float, and a float arm connected with said float and connected revolubly with said shaft and adapted to have a limited swinging movement with respect to said weight arm, the arrangement being such that the initial movement of the float from either its uppermost or its lowermost position serves to swing said weight arm into vertical position ready for continued swinging independently of the float, the continued swinging movement of the weight arm by gravity being adapted to rotate said shaft slightly for operating said valves in unison.

OSCAR G. JOHNSON.